United States Patent [19]

Hirozawa

[11] 4,053,385
[45] Oct. 11, 1977

[54] BONDING STABLE MATERIALS TO RESINOUS CELL FRAMES

[75] Inventor: Stanley T. Hirozawa, Birmingham, Mich.

[73] Assignee: BASF Wyandotte Corporation, Wyandotte, Mich.

[21] Appl. No.: 627,094

[22] Filed: Oct. 30, 1975

[51] Int. Cl.² .................................................. B01K 3/04
[52] U.S. Cl. ...................................... 204/254; 204/268
[58] Field of Search ................................ 204/254–256, 204/268, 279, 95, 266

[56] References Cited

U.S. PATENT DOCUMENTS

| | | | |
|---|---|---|---|
| 3,415,733 | 12/1968 | Koch et al. | 204/279 |
| 3,679,568 | 7/1972 | Westerlund | 204/255 X |
| 3,743,592 | 7/1973 | Metcalff | 204/266 |
| 3,778,362 | 12/1973 | Wiechers et al. | 204/256 X |
| 3,791,947 | 2/1974 | Loftfield | 204/95 |
| 3,873,437 | 3/1975 | Pulver | 204/254 |

Primary Examiner—C. F. Lefevour
Attorney, Agent, or Firm—Bernhard R. Swick; Arnold S. Weintraub; Robert E. Dunn

[57] ABSTRACT

Stable materials, such as films of fluorinated ethylene-propylene copolymers, are bonded to synthetic resinous cell frames with a cyanoacrylate adhesive. The so-covered frames are optimally employed in bipolar electrolytic filter press cells.

9 Claims, 2 Drawing Figures

BONDING STABLE MATERIALS TO RESINOUS CELL FRAMES

BACKGROUND OF THE INVENTION

1. Field of the Invention

The present invention pertains to synthetic resinous cell frames. More particularly, the present invention pertains to synthetic cell frames for use in chlor-alkali cells. Even more particularly, the present invention pertains to means and methods for bonding stable materials to synthetic resinous cell frames for use in chlor-alkali cells.

2. Prior Art

The advent of electrolytic filter press cells for the manufacture of chlorine and caustic has given rise to a wealth of technology with respect thereto. Because of the strong oxidation conditions present in the cell, much research has been expended to derive and define inexpensive materials of construction which will not degrade within the cell environment. Moreover, the prior art has sought materials which will enhance the useful life of the structures disposed within the cell. Thus, there has been taught heretofore the coating of electrodes with fluorohydrocarbons to protect the base material of the electrode. See, inter alia, U.S. Pat. Nos. 3,645,796; 3,461,044 and 3,679,568.

It is to be further appreciated with respect to the prior art that in most instances prolongation of the useful life has been directed to the electrodes, the diaphragm, if present, and the cell structure, including electrical connections. In connection herewith, it is to be noted that very little attention has been paid to the cell frame or barrier which separates adjacent electrodes. Generally, most cell frames are molded or otherwise manufactured from filled or unfilled synthetic resinous materials. Conventionally, most cell frames comprise polypropylene which may be filled with materials such as asbestos or calcium silicate. Other types of synthetic resins used for cell frames include graphite-filled phenol-formaldehyde resins, as taught in U.S. Pat. No. 3,415,733. However, and as noted, filled or unfilled polypropylene is the prevalent material of construction for electrolytic filter press cell frames. This is especially true in a chlor-alkali environment.

However, it has been found that polypropylene cell frames are subject to chemical attack by the electrolytes. This chemical attack can result in a shortened life for the cell frame. More detrimental, however, is that the anolyte solution attacks the cell frame and forms particulate matter therewithin. This particulate matter has been found to plug or foul the cell diaphragm or membrane. This not only damages the diaphragm or membrane but, also, reduces cell efficiency. The present invention, as will subsequently be detailed, alleviates this problem. Concurrently, the present invention enables the use of materials for cell frame construction which are normally incompatible with the electrolyte solutions.

SUMMARY OF THE INVENTION

In accordance with the present invention, a chemically inert film is bonded to the cell frame of a chloralkali filter press cell. The film is bonded to the barrier with an adhesive consisting essentially of a cyanoacrylate.

The cyanoacrylate adhesive used in the practice of the present invention is, preferably, a monomeric ester of 2-cyanoacrylic acid, and specifically an alkyl-2-cyanoacrylate. These compounds are well known and commercially available.

Generally, the alkyl portion of the cyanoacrylate contains from about one to six carbon atoms as well as mixtures thereof.

The inert films utilized herein are those which are chemically stable in strong anolyte environments.

The adhesive is applied to the cell frame by any suitable mode including manual application, spraying, brushing, and the like.

For a more complete understanding of the present invention, reference is made to the following detailed description and accompanying examples as well as the accompanying drawing.

DESCRIPTION OF THE PREFERRED EMBODIMENT

At the outset, it should be noted that attempts have been made heretofore to secure inert films to synthetic resinous frames. In copending U.S. Pat. Application Ser. No. 567,293, filed Apr. 11, 1975, there is disclosed the application of an inert film to a cell frame. According to the copending application, the inert film is secured to the cell frame by either mechanical means, such as fasteners, or by laminating the film to the barrier with heat and pressure. The copending application, also, states that adhesives are not preferred since they are subject to chemical attack by chlorine diffusion. However, it has been found, in accordance herewith, that by employing the cyanoacrylates, as adhesives, the tear strength of the inert film is exceeded by the bond strength.

As noted hereinbefore, the present invention contemplates the bonding of the inert film to a cell frame. Conventionally, the cell frame comprises a molded or otherwise formed synthetic resin such as polypropylene, phenol-formaldehyde resins and the like. Such resinous frames may be filled with materials, such as asbestos, calcium silicate, graphite and the like. The present invention is amenable to any such frame.

As is known to those skilled in the art the inert film is interposed between the diaphragm and the cell frame on the anolyte side thereof. Although not necessary, a similar film can be bonded to the catholyte side of the frame. Where the frame includes a central barrier, the inert film is also secured thereto.

Figure 1:
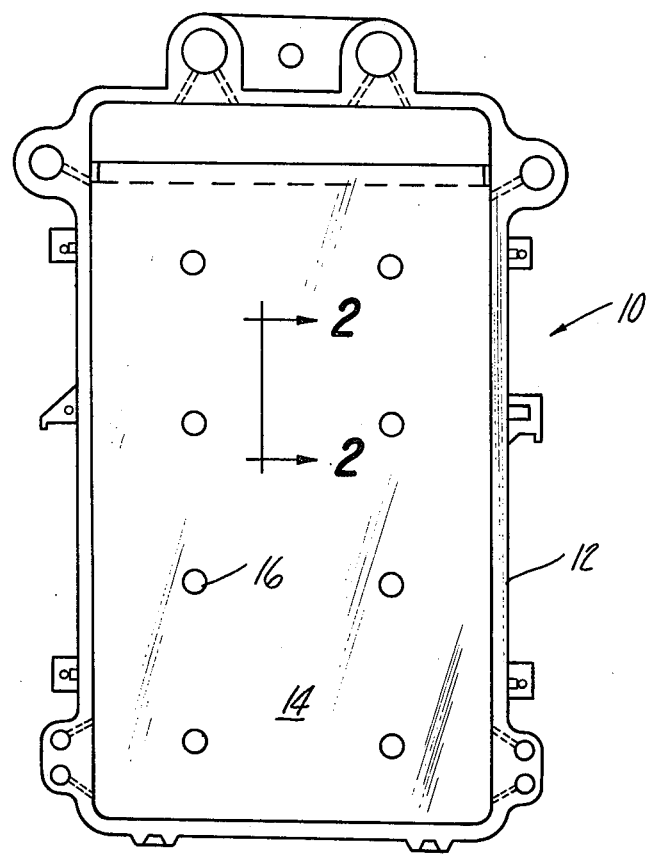
FIG. 1 is a side elevational view of a typical cell frame utilizing the present invention.
Figure 2:
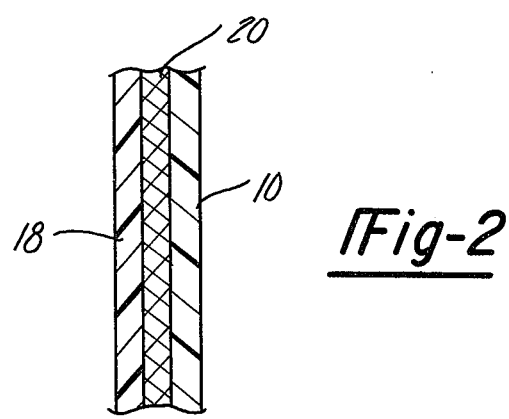
FIG. 2 is a cross-sectional view taken along line 2—2 of FIG. 1.

Referring to the drawing, the principles enumerated herewithin are illustrated. In FIG. 1 there is depicted a conventional cell frame 10 for utilization in a filter press cell. As is known to the skilled artisan, such cell frames include a peripheral structure 12 which is utilized in mounting the cell frame within the filter press cell, per se. Such cell frames, typically, include a central web or barrier 14. However, it is to be understood, that such central barriers do not always comprise a part of the cell frame. In any event, and assuming that such central barriers or webs are utilized, it is that portion thereof which is generally immersed within the electrolytes within the filter press cell.

Such cell frame structures ordinarily include support nubs 16 or similar means for mounting the electrodes onto the cell frame for rendering electrical communication between the respective sides thereof, i.e., the anolyte and catholyte side.

In accordance with the present invention a diaphragm of an inert material, generally, denoted at 18, is mounted onto the cell frame 10 through the use of the cyanoacrylate adhesive 20. It is to be thus appreciated that the adhesive defines the bonding medium to effectuate an exceedingly strong adherence of the inert film are to the cell frame.

The inert films comprise those materials which are chemically stable in the presence of the strong oxidation conditions within the filter press cell. Representative materials which can be used as the inert film include, for example, fluorinated hydrocarbons, polyphenylene oxide, copolymers of polyphenylene oxide, polyarylsulfones, polyphenylene sulfides and the like. Preferably, fluorinated hydrocarbons are employed since they are essentially inert to chemical attack or degradation within a chlor-alkali cell.

Although any fluorinated hydrocarbon can be used herein, it is preferred to employ fluorinated polyalkylenes. The fluorinated polyalkylenes can also contain other halogen substituents. Exemplifying the useful fluorinated polyalkylenes are polytetrafluoroethylene, fluorinated ethylene propylene copolymers, polychlorotrifluoroethylene, polyvinylidenefluoride, polyethylenechlorotrifluorethylene, polyethylenetetrafluoroethylene, tetrafluoroethylene-perfluorovinylether sulfonyl chloride copolymers, perfluoroalkoxy-tetrafluoroethylene copolymers and the like, as well as mixtures thereof.

In the practice of the present invention, the preferred fluorinated polyalkylene is either polytetrafluoroethylene or fluorinated ethylene-propylene copolymers. Both of these products are widely known and commercially available.

Generally, the inert films have a thickness of from about 5 mils to about ¼ inch.

The inert film is bonded to the cell frame by the cyanoacrylate adhesive. The cyanoacrylate adhesive is applied to the surface of the cell frame and the inert film is then applied thereonto. The adhesive can be applied to the frame by any suitable mode including brushing, spraying, immersion or the like. The bonding of the film takes place at room temperature. In applying the film to the frame, the film is pressed into contact with the adhesive by manual pressure or the like. A particularly preferred mode of practicing the invention contemplates the formation of the frame in the mold, the application of the adhesive onto the frame and the molding of the inert film thereonto.

Such method utilizes the mold of the frame to bond the film, thereby avoiding any discontinuities. Also, there is heat and pressure from the mold which facilitates the bonding.

As hereinbefore noted the adhesives employed in the practice of the present invention is a cyanoacrylate adhesive. Cyanoacrylate adhesives are known. See inter alia, U.S. Pat. Nos. 2,784,215; 2,794,788 and British Pat. No. 1,196,068. Essentially these adhesives are monomeric compositions which are cured, i.e., polymerized upon exposure to the atmosphere.

Particularly useful cyanoacrylates are those based upon monomeric esters of 2-cyanoacrylic acid. These compounds generally correspond to the formula:

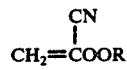

wherein R is either $C_{1-16}$ alkyl, cycloalkyl, alkenyl, cycloalkenyl, phenyl and heterocyclic radicals such as furfuryl and the like. These radicals can be substituted with other substituents which do not adversely affect the monomer, per se, as an adhesive. These esters of 2-cyanoacrylic acid are prepared by techniques known in the prior art, such as described in the U.S. Pat. Nos. 2,467,927 and 3,254,111.

Particularly preferred cyanoacrylate adhesives compositions are the alkylcyanoacrylate adhesives having from about one to six carbon atoms and mixtures thereof in the alkyl portion and, especially, the alkyl-2-cyanoacrylates having from about one to six carbon atoms and mixtures thereof in the alkyl portion thereof.

It should be noted that the monomeric esters of 2-cyanoacrylic acid under consideration herein are more particularly described in U.S. Pat. Nos. 3,832,334 and 3,836,377, the disclosures of which are incorporated by reference.

It has been found that in utilizing the alkylcyanoacrylate adhesives, and as noted hereinbefore, the bond strength between the film and the adhesive exceeds the tear strength of the film. In this regard, it should also be noted that the films generally are provided with an etched side and an unetched side. In contacting the adhesive and the film, the film should have its etched side or surface in contact with the adhesive.

For a more complete understanding of the present invention, reference is made to the following examples. The examples are to be construed as illustrative rather than limitative of the invention.

EXAMPLE I

A ¾ × 2 × 5 inch block of twenty percent calcium silicate-filled polypropylene was cleaned. A thin layer of a alkylcyanoacrylate adhesive was then manually spread over a surface of the block. The alkylcyanoacrylate adhesive used herein was a commercially available product sold under the name Loctite Quick-Set Adhesive 404. This adhesive is generally described as an alkyl-2-cyanoacrylate having from one to two carbon atoms in the alkyl portion.

After the resin was applied to the surface, a sheet of fluorinated ethylene-propylene copolymer was then placed thereover, with the etched surface thereof in contact with the resin. Excess adhesive was pressed out by manual pressure.

After 10 minutes the film was attempted to be pulled away from the block. As this occurred tears appeared in the film.

EXAMPLE II

The procedure of Example I was repeated. However, the adhesive used herein was an alkylcyanoacrylate adhesive sold under the name Eastman 910. Again, in attempting to pull the film away from the block, the film tore.

EXAMPLE III

This example illustrates the necessity of contacting the adhesive with the etched surface of the film.

The procedure of Example I was repeated. However, the unetched surface of the fluorinated ethylene-propylene copolymer was pressed into contact with the adhesive. When the film was attempted to be separated away from the block, separation occurred quite easily.

Although not wishing to be bound by any theory, it would appear that the etched surface has functional groups which form chemical bonds with the acrylate resin. Polypropylene, the dominant compound in the frame, has double bonds which function as chemical "handles." Thus, there are probably being formed chemical bonds by the adhesive with both the etched surface of the film and the cell frame surface.

Having, thus, described the invention, what is claimed is:

1. In a bipolar electrolytic filter press cell, said cell having a central frame interposed between the anode and cathode, the central frame being formed from a synthetic resin, the improvement which comprises:
   an inert film bonded to the frame with a cyanoacrylate adhesive.

2. The improvement of claim 1 wherein the inert film is a fluorinated polyalkylene.

3. The improvement of claim 1 wherein the cell frame is formed from polypropylene containing twenty percent, by weight, of calcium silicate.

4. The improvement of claim 1 wherein the cyanoacrylate adhesive is an alkylcyanoacrylate having from about one to six carbon atoms in the alkyl portion thereof.

5. The improvement of claim 1 wherein the cyanoacrylate adhesive is a 2-cyanoacrylate of the formula:

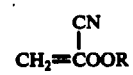

wherein R is selected from the group consisting of $C_1$ to $C_{16}$ alkyl, cycloalkyl, alkenyl, cycloalkenyl, phenyl and furfuryl radicals, and mixtures thereof.

6. The improvement of claim 1 wherein:
   a. the inert film is a fluorinated ethylenepropylene copolymer,
   b. the frame is formed from polypropylene containing about twenty percent, by weight, of calcium silicate, and
   c. the cyanoacrylate adhesive is an alkyl-2-cyanoacrylate having from about one to six carbon atoms and mixtures thereof in the alkyl portion.

7. The improvement of claim 2 wherein the inert film is a fluorinated ethylene-propylene copolymer.

8. The improvement of claim 5 wherein the cyanoacrylate adhesive is an alkyl-2-cyanoacrylate having from about one to six carbon atoms and mixtures thereof in the alkyl portion.

9. The improvement of claim 5 wherein the film has an etched surface, the etched surface being bonded to the frame.